United States Patent [19]

Mead

[11] Patent Number: 5,317,314

[45] Date of Patent: May 31, 1994

[54] ELECTRONIC COUNTER COUNTERMEASURE CIRCUIT FOR AUTOMATIC GAIN CONTROL BY ELECTRONIC COUNTERMEASURE DECEPTION

[75] Inventor: George S. Mead, Maynard, Mass.

[73] Assignee: The United States of America as represented by the Secretary of the Navy, Washington, D.C.

[21] Appl. No.: 223,796

[22] Filed: Feb. 4, 1972

[51] Int. Cl.$^5$ .............................................. G01S 7/36
[52] U.S. Cl. ...................................................... 342/16
[58] Field of Search ......... 343/17.1 R, 18 E, 5 AGC; 342/16, 19

[56] References Cited

U.S. PATENT DOCUMENTS 3,281,837 10/1966 van Hijfte .......................... 343/18 E
3,504,366 3/1970 Tolles et al. ....................... 343/18 E
3,947,846 3/1976 Carnahan et al. ...................... 342/16

FOREIGN PATENT DOCUMENTS 1026200 4/1953 France ............................ 343/5 AGC Primary Examiner—T. H. Tubbesing
Attorney, Agent, or Firm—William C. Townsend; Kenneth W. Dobyns

[57] ABSTRACT

An electronic counter countermeasure (ECCM) circuit for Automatic Gain Control (AGC) electronic countermeasure (ECM) deception of conical scanning tracking radar receivers having a two position limiter in circuit with the AGC circuit to eliminate signal information enhancing the amplitude modulation of the error modulate signal to provide selectable values of dynamic range in a signal processor to render the ECM ineffective in target evaluation.

3 Claims, 2 Drawing Sheets

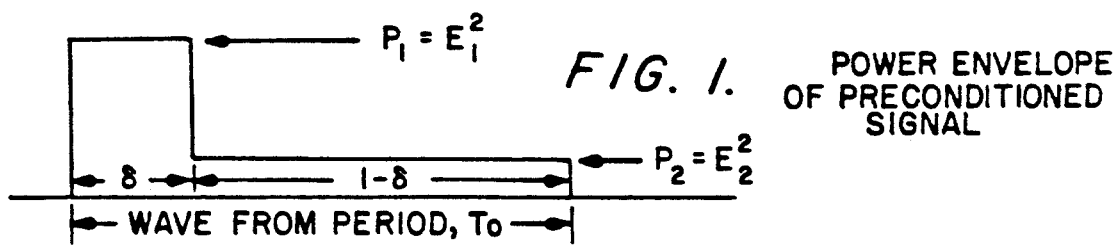
FIG. 1. POWER ENVELOPE OF PRECONDITIONED SIGNAL
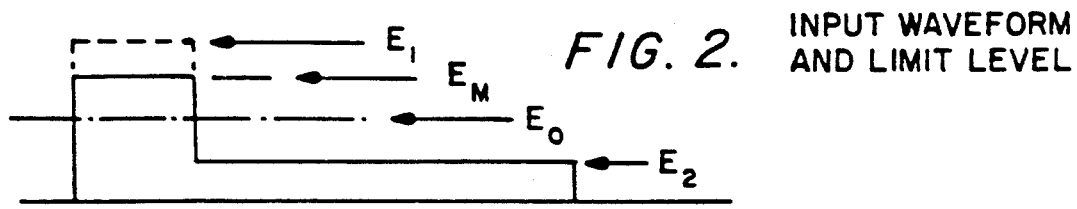
FIG. 2. INPUT WAVEFORM AND LIMIT LEVEL
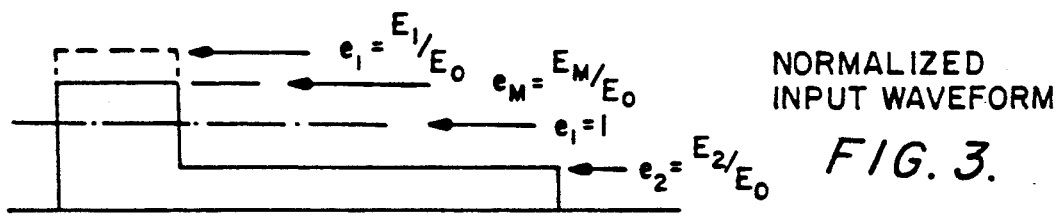
FIG. 3. NORMALIZED INPUT WAVEFORM
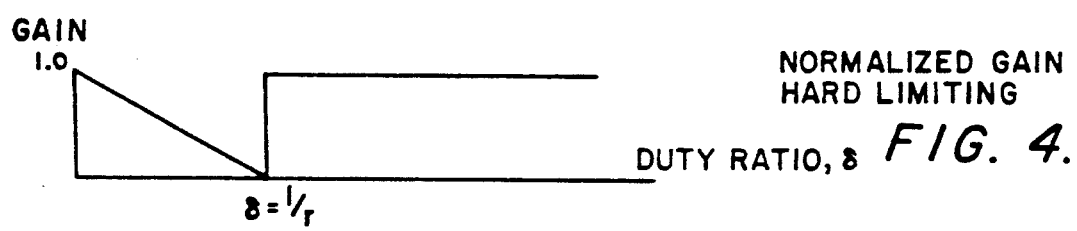
FIG. 4. NORMALIZED GAIN HARD LIMITING
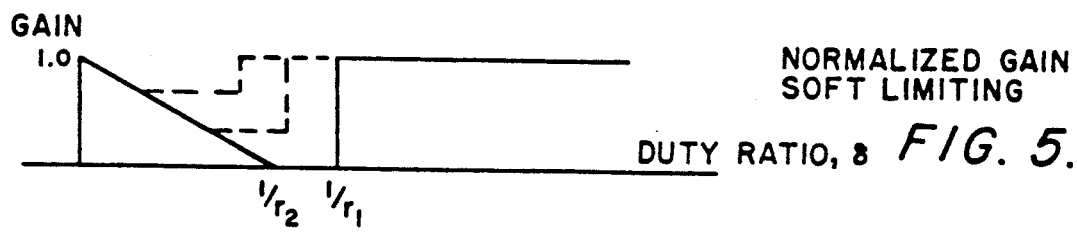
FIG. 5. NORMALIZED GAIN SOFT LIMITING

ELECTRONIC COUNTER COUNTERMEASURE CIRCUIT FOR AUTOMATIC GAIN CONTROL BY ELECTRONIC COUNTERMEASURE DECEPTION

BACKGROUND OF THE INVENTION

This invention relates to ECCM systems and more particularly to selectable means for countering the effects of ECM which deceives the AGC circuits of the radar receiver.

In radar systems and particularly tracking radars using conical scan of the received or echo beam, the radar processor measures the angular difference between the radar target position and the beam position. When a beam pointing error occurs, the scanning process applies a sinusoidal amplitude modulation to the target echo energy. The radar signal processor measures the index of modulation at the conical scan rate and uses this information to drive the tracking loop servo to keep the radar beam pointed at the target. Such conical scanning tracking radars are more fully described in the text *Introduction To Radar Systems*, by Merrill I. Skolnik., published by the McGraw-Hill Book Company in 1962, Section 5.3. Radars employing conical scan, as well as any other radar system which extracts information contained within the amplitude modulation of a carrier, can be degraded or defeated by providing a supplementary premodulation which is equivalent to periodic enhancement of a signal at an arbitrary level. The requirements for effective ECM activity are that the enhancement be large and that the enhancement be accomplished at a duty ratio equal to the reciprocal of the victim signal processor dynamic range. Some prior ECCM radar systems utilize a plurality of radar stations coupled to a computer to compute the intersections of a jamming target with all stations to position the target. Other ECCM radar systems utilize circuitry to differentiate signal voltages in at least two receiver channels to produce an output only upon coincidence of signals and when the sense of the signals are in the same direction to distinguish true target signals. In general the usual approach of combating ECCM is to avoid saturating or overloading the radar receiver with large interfering signals and this is often accomplished with proper shielding and extensive filtering to increase signal-to-noise (SIN) ratio.

SUMMARY OF THE INVENTION

In the present invention a selectable switchable limiter circuit is included in the AGC circuit between the demodulator and the AGC amplifier to apply two selectable discrete values of dynamic range in the signal processor. Since no single value of dynamic range in a signal processor is adequate to preclude ECM deception of this type for all possible duty ratios in the deception waveform, the limiter circuit can be switched to normalize the gain over most of the duty ratio. It is accordingly a general object of this invention to provide at least two selectable discrete values of dynamic range in the AGC circuit of a signal processor for a tracking radar receiver to counter the effects of ECM which deceive the AGC circuit.

BRIEF DESCRIPTION OF THE DRAWINGS

These and other objects and the attendant advantages, features and uses will become more apparent to those skilled in the art as a more detailed description proceeds in consideration of the accompanying drawings in which:

FIGS. 1 through 5 illustrate waveforms for a unit period of time of various aspects of the power envelope;

DESCRIPTION OF THE PREFERRED EMBODIMENT

Figure 6:
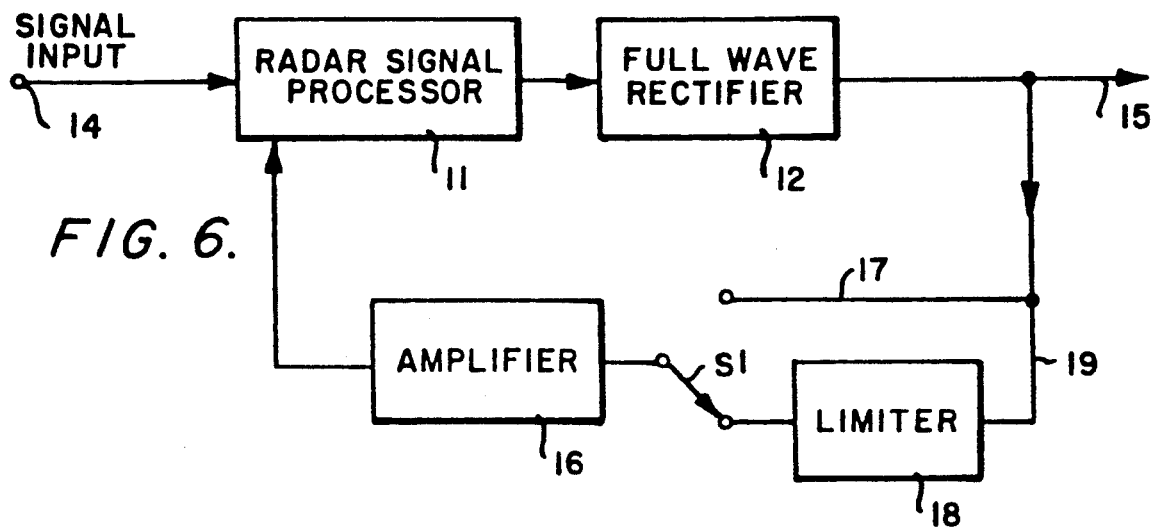
FIG. 6 is a block circuit schematic showing the incorporation of the invention.

In order to describe the invention in an understandable way an analysis of a signal processing system of a tracking radar receiver is given hereinbelow to provide the environment of the invention. This description defines the signal processing gain of a system with output proportional to the apparent index of amplitude modulation when the carrier to be modulated is a two-level periodic waveform. The two-level signal occurs because the ECM source enhances the signal periodically. The alternating presence of jamming-plus-signal or signal alone is equivalent to preconditioning the signal with a priori amplitude modulation by a waveform of the shape indicated in FIG. 1. The data processor will attempt to recover a second (sinusoidal) amplitude modulation applied to the total preconditioned two-level signal as a result of the radar conical scan process. It will be shown that the a priori preconditioning is sufficient to preclude recovery of the amplitude modulation applied by the conical scan. Recovery of the index of modulation is modeled by normalization of the recovered modulation by the average value of the modulated carrier. In practice this is accomplished in an amplifier with an automatic gain control; the dynamic range of the recovery process is defined by the ratio of the maximum linear level attainable with respect to the average carrier level in the gain controlled amplifier. This analysis presumes that the sinusoidal amplitude modulation to be recovered from the enhanced portion of the input waveform is made to vanish (clipped) when the total waveform amplitude is made to exceed the data processor dynamic ranges. The input waveform from which amplitude modulation is to be recovered is a carrier alternating between two levels in a manner such that the instantaneous power available to the data processor is the periodic function of time shown in FIG. 1. The power level is $P_1$ over the interval $\delta$, a fraction of the deception interval, $T_o$. During the remainder of the deception interval, $1-\delta$, the input power level is $P_2$. This corresponds to a jammer-enhanced signal over the interval $\delta$ and a normal, unenhanced, signal over the interval $1-\delta$.

For signal processing which is linear for signals within the processor's operating range, the unmodulated input waveform is bounded by the limits shown in FIG. 2. The level $E_m$ denotes the maximum level the input waveform may attain and $E_o$ is the average value of the limited waveform.

When the input waveform as given a sinusoidal amplitude modulation, such as that provided by a conical scan tracking radar, recovery of the index of modulation on the waveform is accomplished by normalizing the signal parameters to the average value of the waveform, $E_o$, as indicated in FIG. 3. The signal processing gain, g, is then defined as a ratio of recovered index of modulation to applied index of modulation. For systems level controlled by AGC action, $E_o$ is the signal level maintained by the AGC and $e_m$ defines the linear dynamic range, r, about the AGC level.

$$E_m = rE_o$$

$$e_m = \frac{E_m}{E_o} = r$$

The condition required to induce signal excursions past the limit level (limiting) is $$e_1 > e_m = r. \tag{1}$$

Satisfying the condition (1) will place constraints on the duty ratio, $\delta$. when the conditions for limiting are satisfied, the average value of the signal is $$1 = e_o = \delta e_m + (1-\delta)e_2 \tag{2}$$

where $$e_1 = \frac{E_1}{E_o} \text{ and } e_2 = \frac{E_2}{E_o}.$$

Under this condition, the information contained in amplitude modulation is removed by limiting over the interval $\delta$. The effective signal processing gain is then defined by $$g = (1-\delta)e_2 \tag{3}$$

derived from equation (2)

$$1 = \delta e_m + (1-\delta)e_2$$

$$1 - \delta e_m = (1-\delta)e_2$$

$$\frac{1-\delta e_m}{1-\delta} = e_2$$

$$g = (1-\delta)\frac{(1-\delta e_m)}{(1-\delta)}$$

$$g = 1 - \delta e_m \tag{4}$$

$$g = 1 - r\delta \tag{5}$$

Three things are apparent from Equation (5):
a) The effective gain is unity at $\delta = 0$, for $e_2 > 0$
b) The effective gain decreases linearly with increasing $\delta$
c) The effective gain may vanish at $\delta = 1/r$ The condition necessary to cause the gain to vanish is a high jam-to-signal ratio, a situation which corresponds to small values of $e_2/e_1$. this may be shown as follows: Limiting of the input waveform is induced when the peak-to-average value of the signal exceeds the system linear dynamic range, r.

$$\frac{e_1}{\delta e_1 + (1-\delta)e_2} > r. \tag{6}$$

from which:

$$\delta\left(1 - \frac{e_2}{e_1}\right) < \left(\frac{1}{r} - \frac{e_2}{e_1}\right) \tag{7}$$

Driving the signal processing gain to zero requires a small ratio of $e_2/e_1$. For $e_2/e_1 \approx 0$, limiting will occur for:

$$\delta < \frac{1}{r} = \frac{1}{e_m} \tag{8}$$

Limiting does not occur for $\delta > 1/r$, and the processing gain is unity. The normalized signal gain characteristic is sketched in FIG. 4. The linear decrease in gain as a function of $\delta$ for $0 < \delta < 1/r$ was indicted in Equation (5). The result presented here indicates that the signal processing gain of any amplitude modulation recovery system can be degraded or made to vanish by periodically augmenting the input signal. The requirements are (1) large signal enhancement (high $e_1/e_2$ and (2) a duty ratio equal to the reciprocal of processor dynamic range ($\delta = 1/r$). This result occurs because all signal processors have a finite dynamic range. Signal processors are generally designed to operate linearly over a predetermined dynamic range and their response to limiting signal is not usually specified. In most cases, signals which make excursions past the linear range first encounter a non-linearity and then total saturation. The effect is to provide two limit levels, one "soft" and one "hard".

The presence of a "soft" limiting region tends to provide rounding of the sharp corners in the normalized gain characteristic. The model developed here may be applied for a continual of dynamic ranges between the end of the linear region and the beginning of the saturation region. A simplified case is shown in FIG. 5, where processing is linear up to $r_1$ and total limiting occurs beyond $r_2$. The signal processing gain tends to vanish for ECM duty ratios in the region $1/r_2 < \delta < 1/r_1$.

Referring more particularly to FIG. 6 there is illustrated an AGC circuit in block circuit form. A tracking radar signal processor 11 is coupled in series through a full wave rectifier 12 or demodulator from an input 14 to an output 15 of radar signals, as well understood by those skilled in the art. The output 15 is fed back through an AGC amplifier 16 to the signal processor 11 of the radar receiver to maintain the amplitude of the modulating signals within operable limits or normalized.

In the present invention a single pole, double throw switch S1 is switchable to couple the feedback directly from the output 15 to the amplifier 16 by way of branch conductor 17 or through a limiter 18 by way of branch conductor 19.

Figure 7:
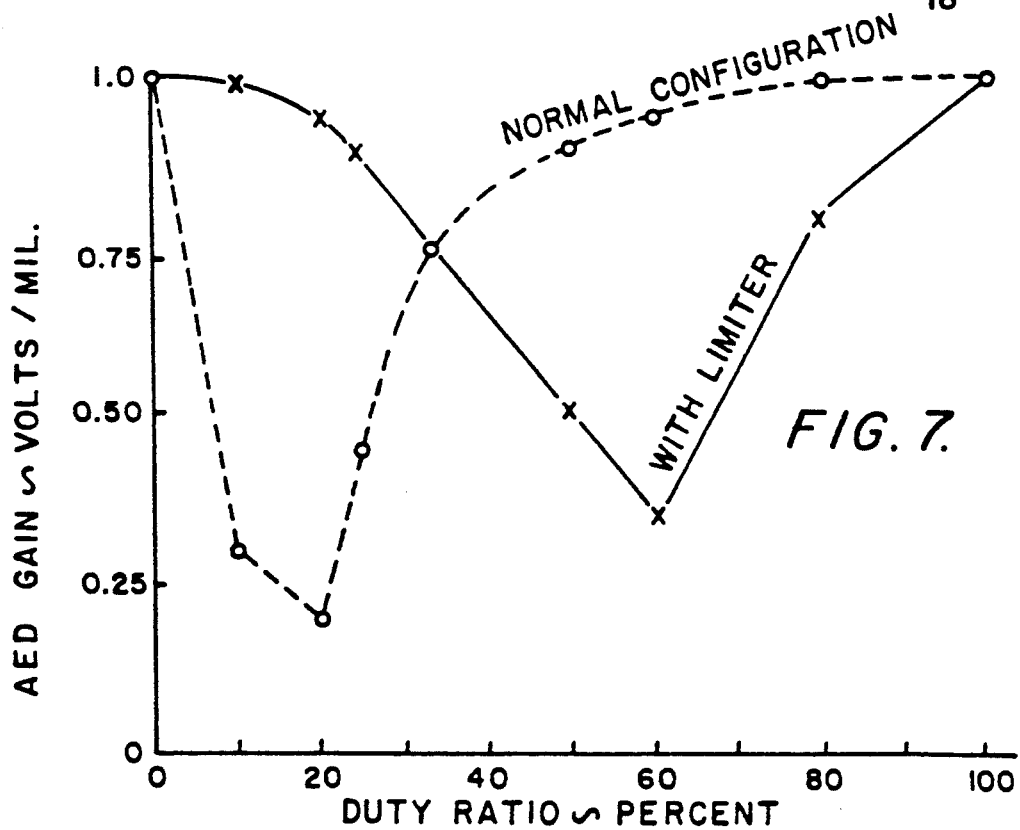
FIG. 7 illustrates in graph form the gain of the error detector with respect to the duty ratio in percent.

The limiter 18 provides a severe restriction on dynamic range and radically alters the nature of the deception susceptibility characteristic. Since it is not possible to operate the ECCM device at two duty ratios simultaneously, the provision of a switchable limiter circuit provides a solution to the deception ECM susceptibility. With the switch S1 positioned as shown in FIG. 6 to feedback signals through the limiter 18, the gain of the radar signal processing circuit, and particularly the angle error detector, was found to provide a deception duty ratio at a gain as shown in a solid line in FIG. 7. By switching S1 to the direct line 17 the angle error detector gain to deception duty ratio percent was provided as shown by the broken line in FIG. 7. This data indicates that the radar signal processor exhibits two distinct values of dynamic range with and without the limiter applied. To close the radar tracking loop with an acceptable margin of stability, the normalized gain should be maintained at least 50 percent of the time. FIG. 7 shows that at least one of the two configurations is always sufficient to maintain adequate tracking loop gain. Therefore if the limiter 18 were switched in circuit 50 percent of the time the angle error detector gain would average in the upper half of the scale where 1 volt for each milliradian of tracker point error is used as a function of deception duty ratio 40 percent.

While many modifications may become apparent after the teaching herein, I desire to be limited in the spirit of my invention only by the scope of the appended claims.

I claim:

1. In a radar receiver circuit having an automatic gain control feedback comprising:
    a radar signal processor and a demodulator coupled in series from an input of received radar signals to a rectified output;
    an automatic gain control amplifier in a feedback circuit form said rectified output to said radar signal processor, said feedback circuit having first and second branch conductors connectable between said rectified output and an input to said automatic gain control amplifier;
    a limiter in said first branch conductor; and
    a switch in said feedback circuit for selectively connecting said first and second branch conductors with said automatic gain control amplifier whereby feedback signals can either be applied directly to said automatic gain control amplifier or applied through a limiter of changes in dynamic range.

2. In a radar receiver circuit as set forth in claim 1 wherein
    said switch is a single-pole-double-throw switch to limit the amplitude of said feedback signals to values below amplifier saturation.

3. In a radar receiver circuit as set forth in claim 2 wherein
    said switch is switched periodically to maintain a normalized gain of said automatic gain controlled amplifier to at least 50 percent.

* * * * *